US012645930B2

(12) United States Patent　　　(10) Patent No.:　US 12,645,930 B2
Yoo et al.　　　　　　　　　　(45) Date of Patent:　　Jun. 2, 2026

(54) APPARATUS AND METHOD FOR TRAINING LOW BIT-PRECISION DEEP NEURAL NETWORK

(71) Applicant: Korea Advanced Institute of Science and Technology, Daejeon (KR)

(72) Inventors: Hoi Jun Yoo, Daejeon (KR); Dong Hyeon Han, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1276 days.

(21) Appl. No.: 17/206,164

(22) Filed: Mar. 19, 2021

(65) Prior Publication Data

US 2022/0222523 A1　　Jul. 14, 2022

(30) Foreign Application Priority Data

Jan. 8, 2021　　(KR) ........................ 10-2021-0002846

(51) Int. Cl.
*G06N 3/08*　　　　(2023.01)
*G06N 3/04*　　　　(2023.01)

(52) U.S. Cl.
CPC ................. *G06N 3/08* (2013.01); *G06N 3/04* (2013.01)

(58) Field of Classification Search
CPC ....................................................... G06N 3/08
See application file for complete search history.

(56) References Cited

U.S. PATENT DOCUMENTS

2019/0034784 A1　1/2019　Li et al.
2019/0236436 A1*　8/2019　Imber ................... G06F 7/4836
(Continued)

FOREIGN PATENT DOCUMENTS

KR　　10-2020-0026455 A　　3/2020
KR　　10-2020-0104201 A　　9/2020

OTHER PUBLICATIONS

Gautham, Smitha. "An Efficient Implementation of an Exponential Random Number Generator in a Field Programmable Gate Array (FPGA)." (2010).*

(Continued)

*Primary Examiner* — Kakali Chaki
*Assistant Examiner* — Charles Jeffrey Jones
(74) *Attorney, Agent, or Firm* — Revolution IP, PLLC

(57)　　　　　ABSTRACT

Disclosed herein are an apparatus and method for training a low-bit-precision deep neural network. The apparatus includes an input unit configured to receive training data to train the deep neural network, and a training unit configured to train the deep neural network using training data, wherein the training unit includes a training module configured to perform training using first precision, a representation form determination module configured to determine a representation form for internal data generated during an operation procedure for the training and determine a position of a decimal point of the internal data so that a permissible overflow bit in a dynamic fixed-point system varies randomly, and a layer-wise precision determination module configured to determine precision of each layer during an operation in each of a feed-forward stage and an error propagation stage and automatically change the precision of a corresponding layer based on the result of determination.

1 Claim, 13 Drawing Sheets

(56) References Cited

U.S. PATENT DOCUMENTS

| | | | |
|---|---|---|---|
| 2020/0202218 A1* | 6/2020 | Csefalvay | G06Q 20/3672 |
| 2020/0210840 A1* | 7/2020 | Darvish Rouhani | G06N 3/082 |
| 2021/0110508 A1* | 4/2021 | Mellempudi | G06F 7/523 |
| 2024/0135155 A1* | 4/2024 | Hatta | G06N 3/0464 |

OTHER PUBLICATIONS

Li, Yuhang, Wei Wang, Haoli Bai, Ruihao Gong, Xin Dong, and Fengwei Yu. "Efficient bitwidth search for practical mixed precision neural network." arXiv preprint arXiv:2003.07577 (2020). (Year: 2020).*

Stack Overflow Answer, https://stackoverflow.com/questions/5887709/getting-random-numbers-in-java (Year: 2018).*

Gautham, Smitha. "An Efficient Implementation of an Exponential Random Numbers Generator in a Field Programmable Gate Array (FPGA)." (2010). (Year: 2010).*

Jinsu Lee et al., "The Hardware and Algorithm Co-Design for Energy-Efficient DNN Processor on Edge/Mobile Devices", The Hardware and Algorithm Co-Design for Energy-Efficient DNN Processor on Edge/Mobile Devices, vol. 67, No. 10, Oct. 2020, pp. 3458-3470.

FP32-FP16 Mixed-precision training: https://docs.nvidia.com/deeplearning/performance/mixed-precision-training/index.html provided by NVIDIA.

Naigang Wang et al., "Training Deep neural networks with 8-bit Floating Point Numbers", 32nd Conference on Neural Information Processing Systems (NeurIPS 2018).

Jo, Su-Jeong, "Training Methods for Deep neural networks using Low Precision Dynamic Fixed-Point", M.S. Thesis, 2019 in dissertation at Seoul National University.

Shuchang Zhou et al., "Dorefa-Net: Training Low Bitwidth Convolutional Neural Networks With Low Bitwidth Gradients", Arxiv:1606.06160.

* cited by examiner

[FIG.1]
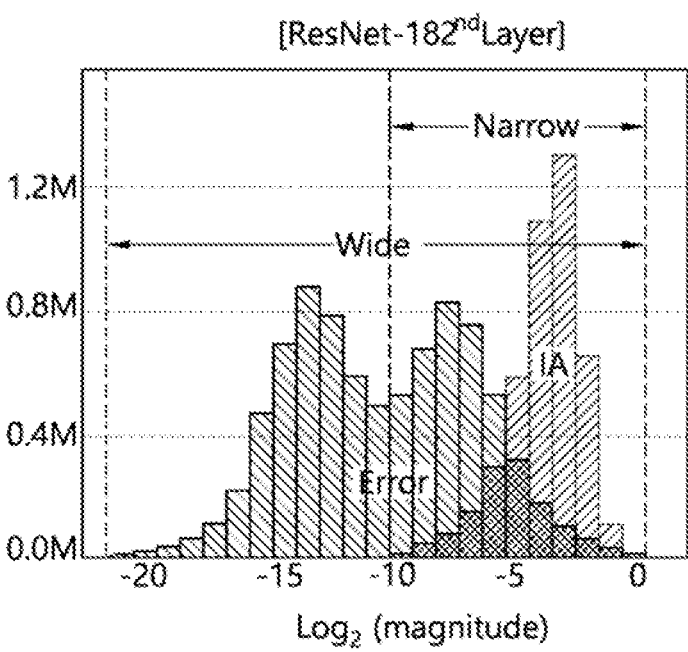

[FIG.2]
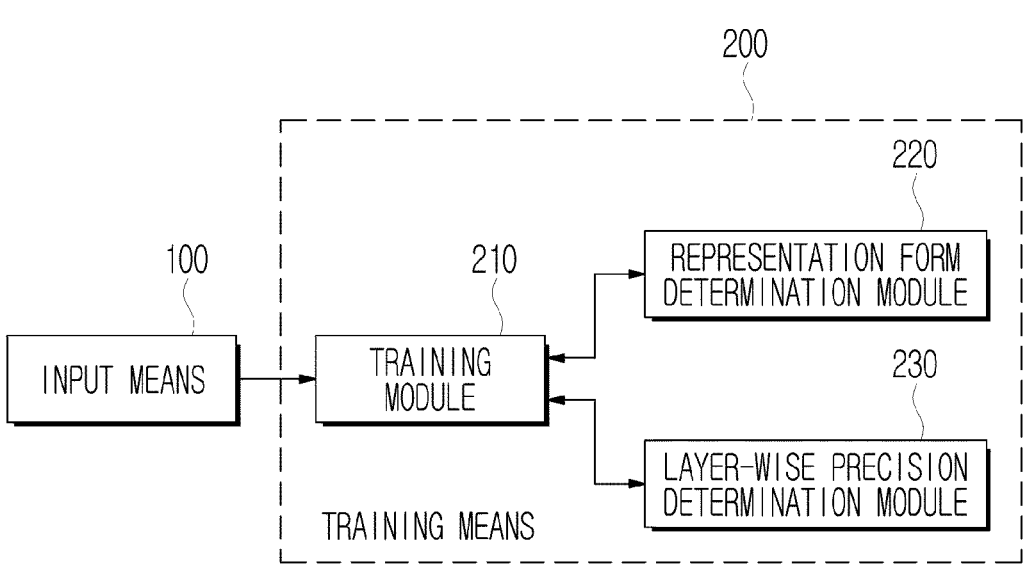

[FIG.3]
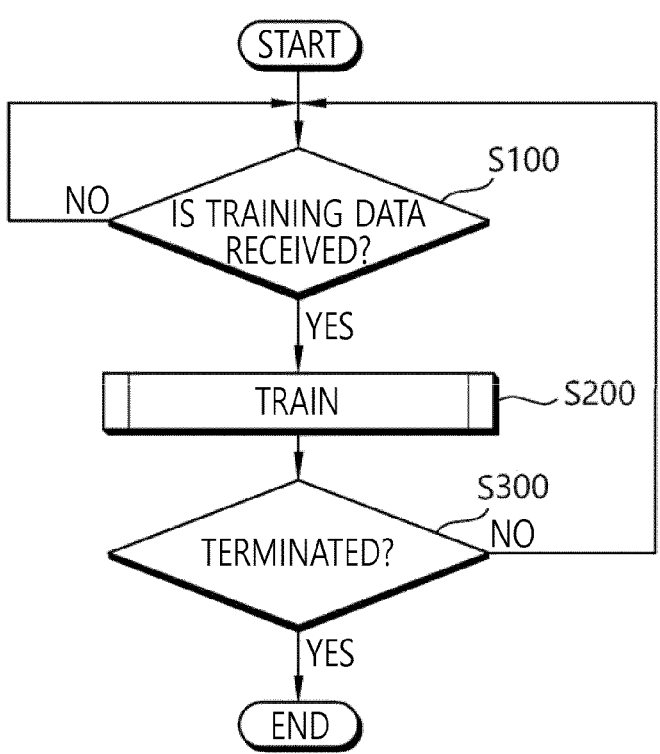

[FIG.4]
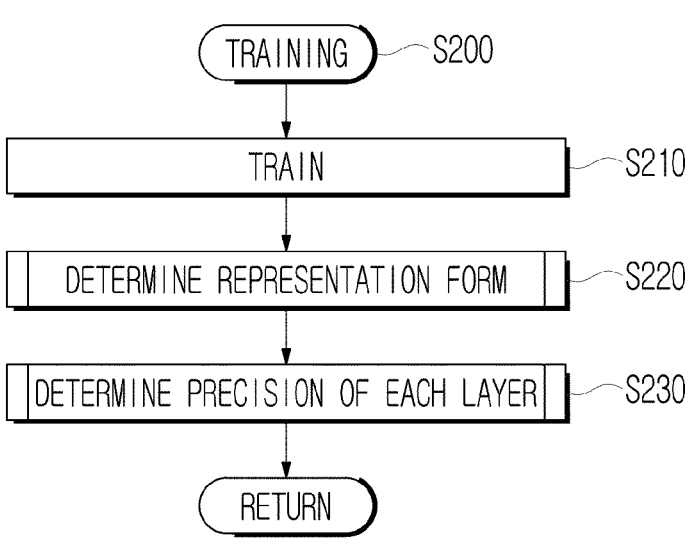

[FIG.5]
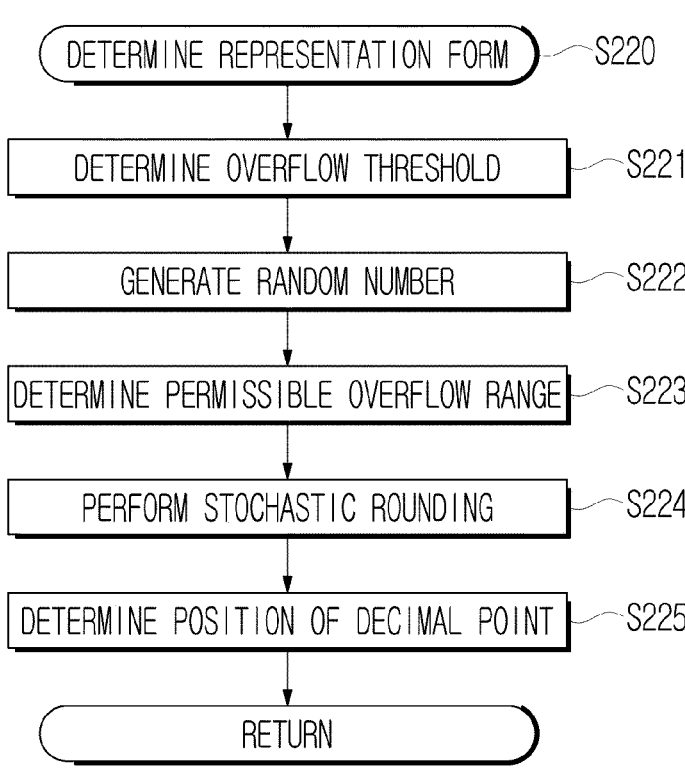

[FIG.6]
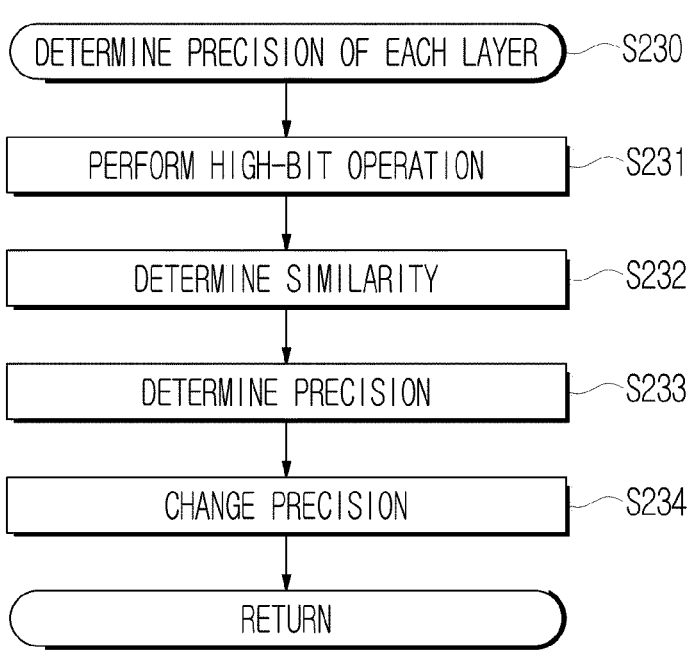

Figure 7A:
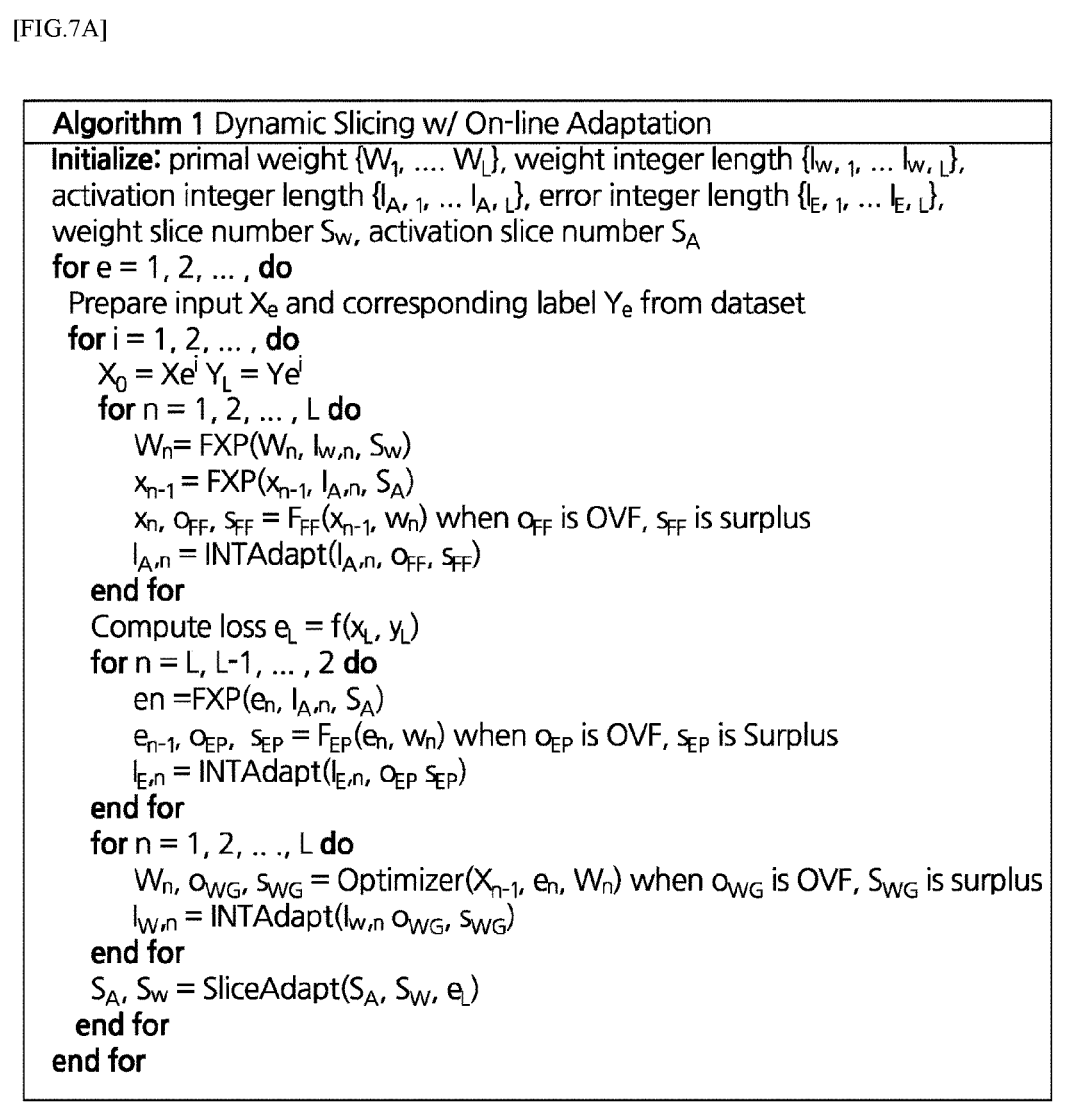

Algorithm 1 Dynamic Slicing w/ On-line Adaptation

---

Initialize: primal weight $\{W_1, .... W_L\}$, weight integer length $\{l_{w,1}, ... l_{w,L}\}$, activation integer length $\{l_{A,1}, ... l_{A,L}\}$, error integer length $\{l_{E,1}, ... l_{E,L}\}$, weight slice number $S_W$, activation slice number $S_A$ for e = 1, 2, ... , do

Prepare input $X_e$ and corresponding label $Y_e$ from dataset for i = 1, 2, ... , do

$X_0 = Xe^i \; Y_L = Ye^i$ for n = 1, 2, ... , L do

$W_n = FXP(W_n, l_{w,n}, S_W)$ $X_{n-1} = FXP(x_{n-1}, l_{A,n}, S_A)$ $X_n, o_{FF}, s_{FF} = F_{FF}(x_{n-1}, W_n)$ when $o_{FF}$ is OVF, $s_{FF}$ is surplus $l_{A,n} = INTAdapt(l_{A,n}, o_{FF}, s_{FF})$ end for

Compute loss $e_L = f(x_L, y_L)$ for n = L, L-1, ... , 2 do

$en = FXP(e_n, l_{A,n}, S_A)$ $e_{n-1}, o_{EP}, s_{EP} = F_{EP}(e_n, W_n)$ when $o_{EP}$ is OVF, $s_{EP}$ is Surplus $l_{E,n} = INTAdapt(l_{E,n}, o_{EP} \; s_{EP})$ end for for n = 1, 2, ... ., L do

$W_n, o_{WG}, s_{WG} = Optimizer(X_{n-1}, e_n, W_n)$ when $o_{WG}$ is OVF, $S_{WG}$ is surplus $l_{W,n} = INTAdapt(l_{w,n} \; o_{WG}, s_{WG})$ end for

$S_A, S_W = SliceAdapt(S_A, S_W, e_L)$ end for end for

[FIG.7B]

| Algorithm 2 Fixed-point Translation |
|---|
| Function FXP(x, I, S) |
|   x = floor(x $\times$ power(2, S-1)) |
|   if (x $\geq$ power(2, I)) then |
|     x = power(2, I) - power(2, I-S) $\rightarrow$ Clipping |
|   else if (x $\leq$ -power(2, I)) then |
|     x = - power(2, I) + power(2, I-S) $\rightarrow$ Clipping |
|   end if |
|   return x |
| end function |

[FIG.7C]

| Algorithm 3 Integer Length Adaptation |
|---|
| Function INTAdapt(I, o, s) |
|   if ($o_{FF}$ or $o_{EP}$) is True then |
|     I = I + 1 |
|   else if ($s_{FF}$ or $s_{EP}$) is True then |
|     I = I - 1 |
|   end if |
|   return I |
| end function |

[FIG.7D]

| Algorithm 4 Slice Number Adaptation |
|---|
| Function SliceAdapt($S_A$, $S_W$, $e_L$) |
|   $S_A$, $S_W$ = SliceEvaluator_FSM($S_A$, $S_W$, $e_L$) |
|   return $S_A$, $S_W$ |
| end function |

[FIG.8]
Stochastic rounding
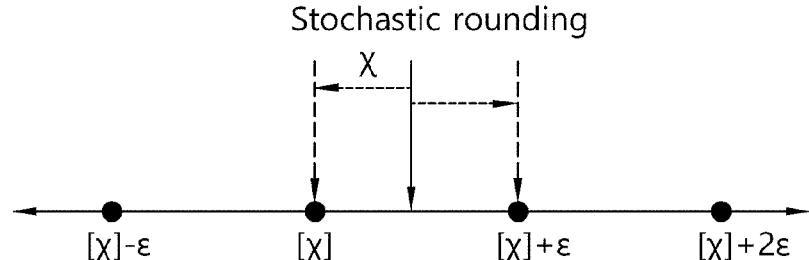
$$Round(\chi, <IL, FL>)=$$
$$\begin{cases} [\chi] & w.p.\ 1 - \dfrac{\chi-[\chi]}{\varepsilon} \\[2em] [\chi]+\varepsilon & w.p.\ \dfrac{\chi-[\chi]}{\varepsilon} \end{cases}$$

[FIG.9]
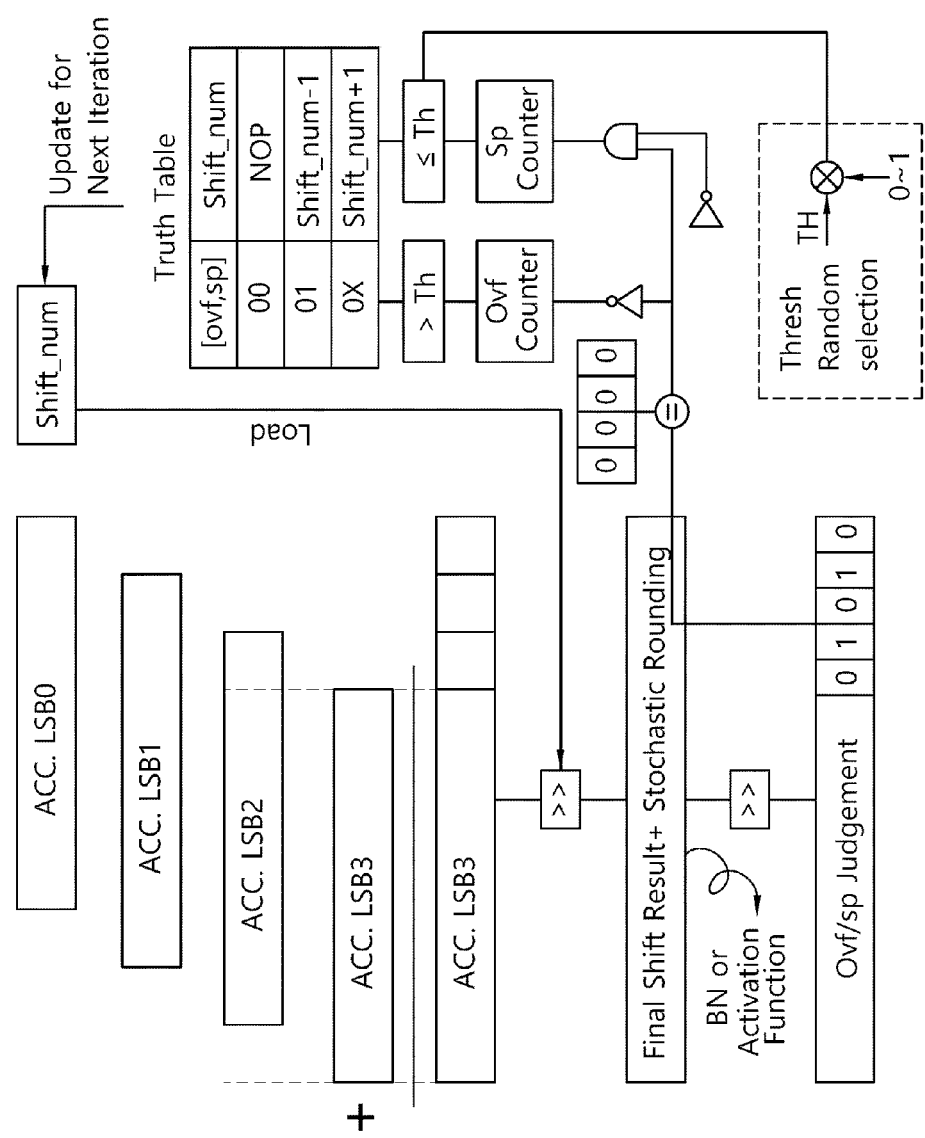

[FIG.10A]
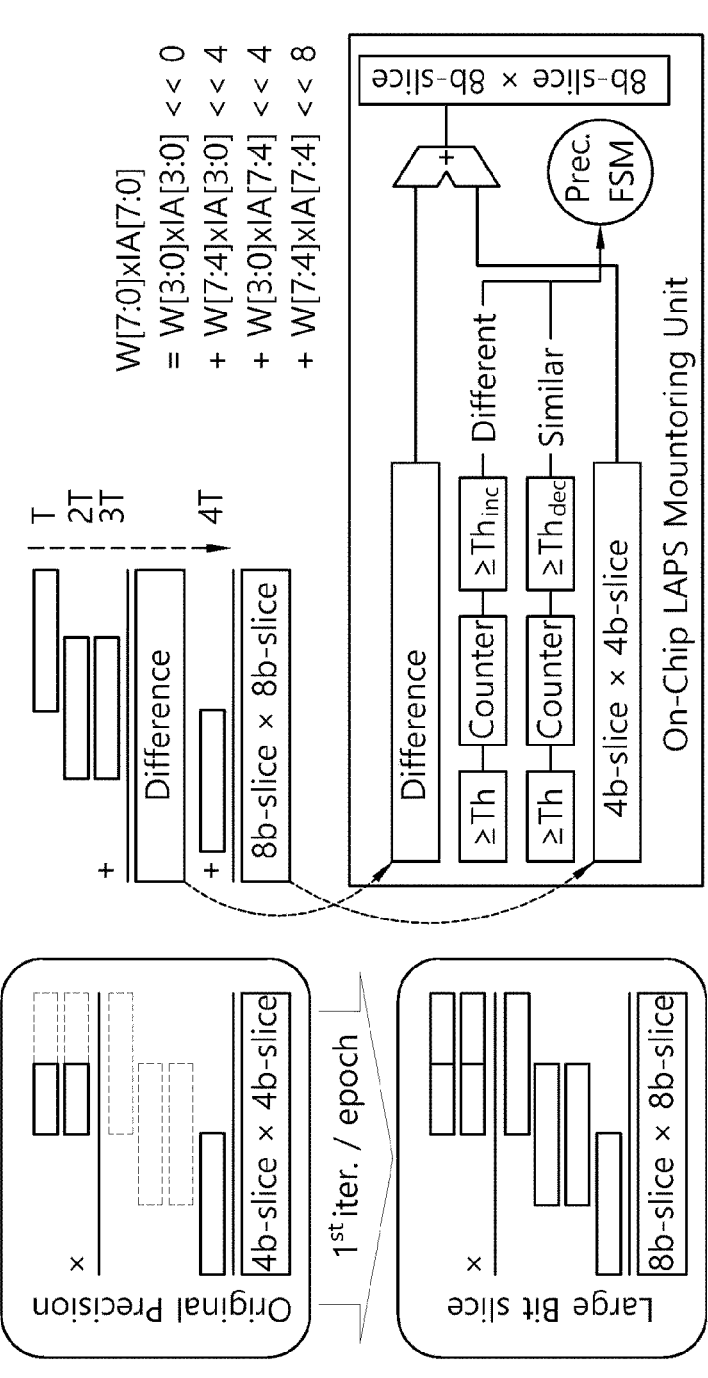

[FIG.10B]
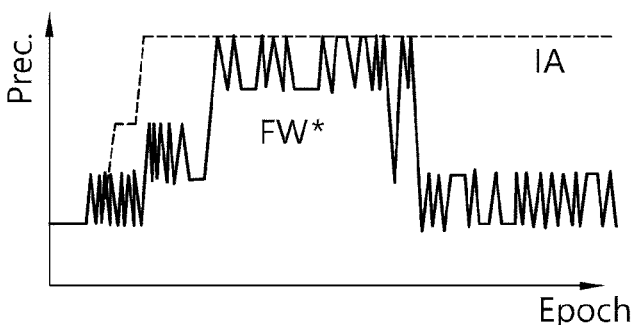
[FIG.10C]
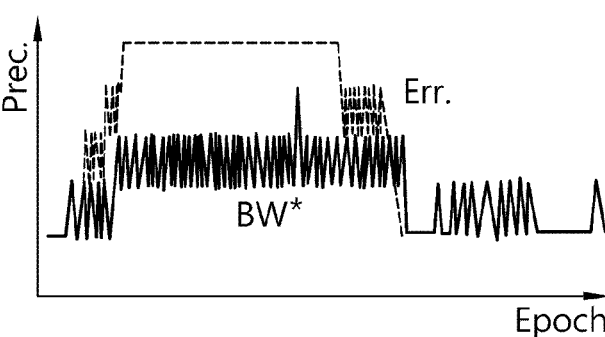

[FIG.11]
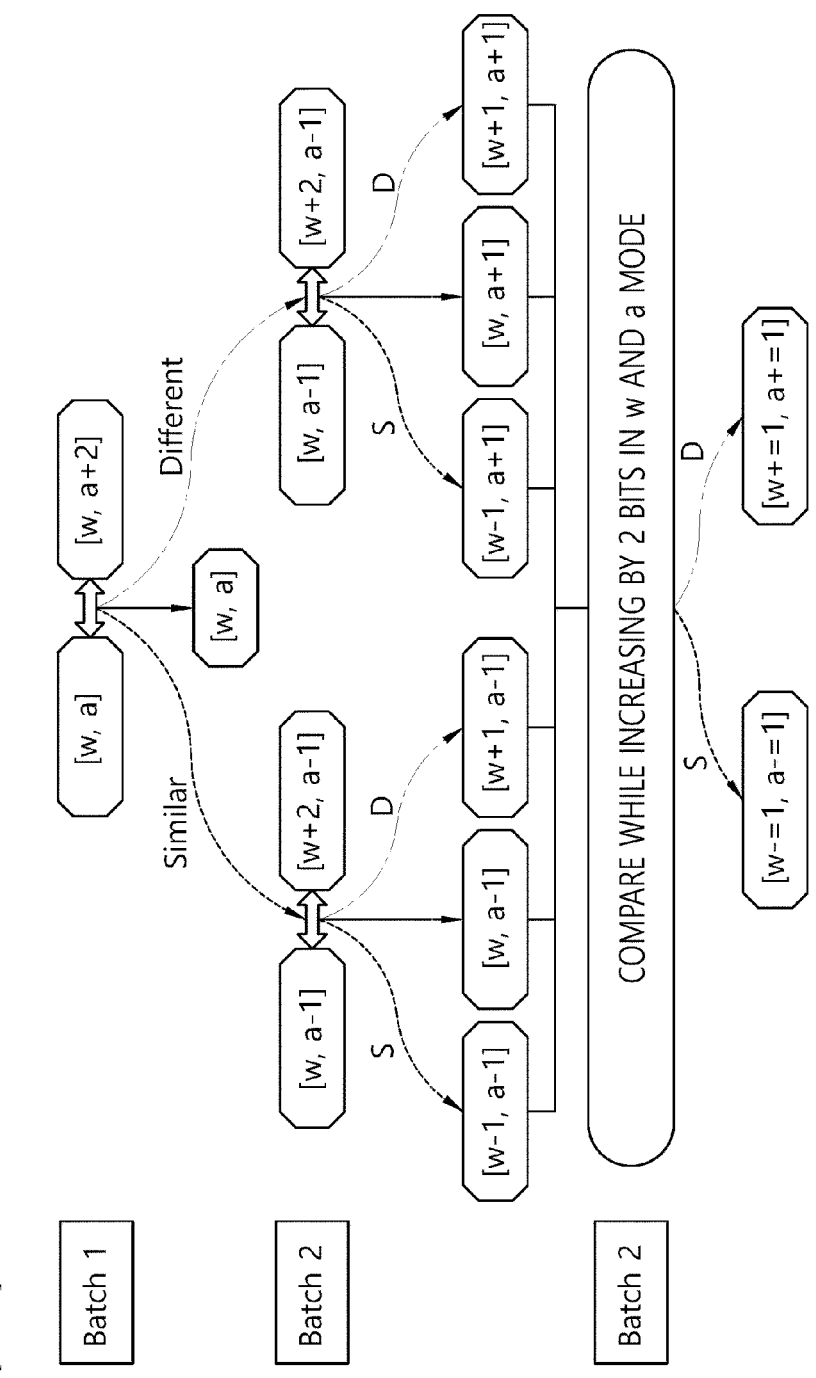

APPARATUS AND METHOD FOR TRAINING LOW BIT-PRECISION DEEP NEURAL NETWORK

CROSS REFERENCE TO RELATED APPLICATION(S)

This application claims the benefit of Korean Patent Application No. 10-2021-0002846, filed Jan. 8, 2021, which is hereby incorporated by reference in its entirety into this application.

BACKGROUND OF THE INVENTION

1. Technical Field

The present invention relates generally to an apparatus and method for training a Deep Neural network (DNN) and, and more particularly to an apparatus and method for training a deep neural network, which use a new number system for training a deep neural network at low bit precision and an algorithm for automatically searching for a required precision of each layer.

2. Description of the Related Art

A deep neural network (hereinafter referred to as a 'DNN'), which is one type of machine-learning technology, denotes an artificial neural network including multiple hidden layers between an input layer and an output layer, and has been utilized in various fields such as object recognition, as well as speech recognition and translation.

In order to minimize the loss of accuracy, training of a deep neural network adopts a floating-point representation system having bit precision higher than that of 16 or more bits. Thus, the training of a deep neural network is dependent on a cloud server having high computing power.

In this case, since data of a user must be transmitted to the server, invasion of privacy and a long delay time may occur, and thus a problem may arise in that only limited functionality may be provided to the user.

In the past, in order to solve this problem, a tendency has arisen for the training of a neural network to be performed by the server and inference to be directly supported by a mobile device owned by each user. That is, low-bit quantization algorithms are applied to a neural-network inference process which has conventionally used an existing 32-bit floating-point representation or 64-bit floating-point representation. Accordingly, the development of low-power and high-speed mobile deep-neural-network inference processors has been promoted while bit precision for inference has decreased below 8 bits, and a deep-learning application, which has to date been dependent on a server, may be independently performed by a mobile device.

However, in this conventional method, among three stages of training (i.e., Feed-Forward: FF, error propagation: EP, and weight gradient update: WG), only the feed-forward stage can be accelerated by the mobile device, and the overall deep-neural-network training process still depends a lot on the server. The reason for this is the high-bit precision required by deep-neural-network training.

FIG. 1 is a diagram for explaining the reason why typical deep-neural-network training requires bit precision higher than that of a feed-forward (FF) stage. Referring to FIG. 1, it can be seen that input activation (IA) values used in feed-forward have a distribution range as narrow as $-10$ $Log_2$(magnitude), whereas error values used in training have a distribution range of $-20$ $Log_2$(magnitude), evidently being wider than that of IA.

Due thereto, the inference (feed-forward) can sufficiently utilize low bit precision such as a 4-bit fixed-point representation, but training should use a floating-point system of 16 or more bits. In contrast, a floating-point system is characterized by having a number representation range wider than that of a fixed-point system because a number is represented to be divided into an exponent part and a fractional part. However, bit variability of a calculator using a floating point is deteriorated, thus making it difficult to minimize the amount of energy that is wasted depending on the optimal number of bits. Due thereto, there is a method for training a deep neural network using a fixed point, but high precision of 16 or more bits is still required for training even if a dynamic fixed point is utilized.

That is, existing deep-neural-network training requires high precision due to the wide distribution of errors appearing in the error propagation (EP) stage, and requires precision of at least 16 bits regardless of whether a floating-point system or a fixed-point system is adopted.

In this way, training of a deep neural network requiring precision of 16 bits or more not only requires a calculator that consumes large amounts of power, but also greatly increases memory access, and thus it is not suitable for use in mobile devices.

Also, the optimal precision required by a deep neural network varies greatly depending on the type of a data set, the type of a network, and the type and location of a layer. Accordingly, in order to find the optimal precision required by each deep neural network, the conventional technology mainly uses a method for retraining a deep neural network using low bit precision on the assumption that training of a deep neural network has been completed at high bit precision. When this method is used, the optimal number of bits may be determined only through repeated trial and error. Such a conventional method is not only disadvantageous in that high-bit training of a deep neural network is premised and retraining is required, but also problematic in that repeated trial and error must be undergone, thus requiring a long time to find the optimal number of bits.

Meanwhile, the importance of deep-neural-network training has gradually increased for distributed training, user optimization, adaptation to changing environments, etc., and thus there is presently required a method capable of supporting deep-neural-network training at low bit precision.

PRIOR ART DOCUMENTS

Non-Patent Documents (Non-Patent Document 1) FP 32-FP16 Mixed-precision training: https://docs.nvidia.com/deeplearning/performance/mixed-precision-training/index.html provided by NVIDIA (Non-Patent Document 2) Training Deep neural networks with 8-bit Floating Point Numbers, NIPS 2018

(Non-Patent Document 3) Training Methods for Deep neural networks using Low Precision Dynamic Fixed-Point, 2019 in dissertation at Seoul National University (Non-Patent Document 4) DoReFa-Net: Training Low Bitwidth Convolutional Neural Networks with Low Bitwidth Gradients, Arxiv:1606.06160

SUMMARY OF THE INVENTION

Accordingly, the present invention has been made keeping in mind the above problems occurring in the prior art, and an object of the present invention is to provide an apparatus and method for training a low-bit-precision deep neural network, which determine the number of integer bits of training data by adopting a dynamic fixed-point (DFXP) system and by introducing a Stochastic Dynamic FiXed-Point (SDFXP) system that supports both Stochastic Rounding (SR) and Stochastic Thresholding (ST), thus conveying an effect similar to the effect of training using a large number of bits even when using a small number of bits.

Another object of the present invention is to provide an apparatus and method for training a low-bit-precision deep neural network, which determine a similarity by comparing the result of a high-bit operation with the result of a low-bit operation during an operation in each of a feed-forward stage and an error propagation stage, and determine whether the precision of a corresponding layer is to be scaled based on the result of the determination, thus finding an optimal precision of each layer of the deep neural network.

A further object of the present invention is to provide an apparatus and method for training a low-bit-precision deep neural network, which can find the optimal precision of a corresponding layer during the progress of learning and perform a comparison between operations during only some initial iterations, among multiple iterations included in each epoch, thus minimizing the time required to scale the precision of each layer.

In accordance with an aspect of the present invention to accomplish the above objects, there is provided an apparatus for training a deep neural network including a hidden layer composed of n layers (where n is a natural number) between an input layer and an output layer, the apparatus including an input unit configured to receive training data required to train the deep neural network; and a training unit configured to train the deep neural network using the training data, wherein the training unit includes a training module configured to perform training using a preset first precision; a representation form determination module configured to determine a representation form for pieces of internal data generated during an operation procedure for the training and to determine a position of a decimal point of the pieces of internal data so that a permissible overflow bit in a dynamic fixed-point system varies randomly; and a layer-wise precision determination module configured to determine a precision of each layer during an operation in each of a feed-forward stage and an error propagation stage, which are performed for training, and to automatically change a precision of a corresponding layer based on a result of the determination.

In an embodiment, the representation form determination module may include a storage unit configured to store an overflow threshold, which is a maximum number of bits permitting the overflow; a random number generator configured to generate a random number between 0 and 1 in response to generation of the internal data; a multiplier configured to determine a permissible overflow range by multiplying the overflow threshold by the random number; and a decimal point position determination unit configured to determine the position of the decimal point of the pieces of internal data based on the permissible overflow range.

In an embodiment, the representation form determination module may further include a rounding unit configured to perform stochastic rounding on the internal data, and the decimal point position determination unit determines a position of a decimal point of internal data, to which the stochastic rounding is applied, based on the permissible overflow range.

In an embodiment, the layer-wise precision determination module may further perform a high-bit operation using a second precision higher than the first precision of each layer during the operation in each of the feed-forward stage and the error propagation stage, and thereafter determine the precision of the corresponding layer based on a similarity between a result of a low-bit operation using the first precision and a result of a high-bit operation using the second precision.

In an embodiment, the layer-wise precision determination module may store a first threshold value, which is preset as a reference for a similarity based on which whether the precision of each layer is to be changed is determined and a second threshold value, which is preset to a value greater than the first threshold value, and the layer-wise precision determination module may be configured to, when the similarity is less than or equal to the first threshold value, change the precision of the corresponding layer to a value higher than the first precision, when the similarity is equal to or greater than the second threshold value, change the precision of the corresponding layer to a value lower than the first precision, and when the similarity is between the first threshold value and the second threshold value, maintain the first precision.

In an embodiment, the layer-wise precision determination module may automatically change the precision of the corresponding layer, for all layers except the input layer and the output layer.

In an embodiment, the layer-wise precision determination module may automatically change the precision of each layer only during first m iterations, among multiple iterations included in each epoch, which is a training unit for each layer, and the training module may perform training during iterations ranging from an (m+1)-th iteration based on the precision of each layer automatically changed by the layer-wise precision determination module.

In an embodiment, the layer-wise precision determination module may configure a Finite-State Machine (FSM) based on results of the low-bit operation and the high-bit operation that are performed to automatically determine the precision of each layer during the first m iterations, and may change the precision of the corresponding layer based on the result of the configuration.

In an embodiment, the layer-wise precision determination module may be configured to, in the feed-forward stage, perform a high-bit operation by adding a bit corresponding to at least one of a feed-forward weight and an input activation value of the deep neural network, and in the error propagation stage, perform a high-bit operation by adding a bit corresponding to at least one of a backward weight and an error value of the deep neural network.

In accordance with another aspect of the present invention to accomplish the above objects, there is provided a method for training a deep neural network including a hidden layer composed of n layers (where n is a natural number) between an input layer and an output layer, the method including performing an input operation of receiving training data required to train the deep neural network; and performing a training operation of training the deep neural network using the training data so that the training is performed using first precision, which is preset for each layer, wherein performing the training operation may include performing a representation form determination operation of determining a representation form for pieces of internal data generated during an operation procedure for the training and determining a position of a decimal point of the pieces of internal data so that a permissible overflow bit in a dynamic fixed-point system varies randomly; and performing a layer-wise precision determination operation of determining a precision of each layer during an operation in each of a feed-forward stage and an error propagation stage, which are performed for training, and automatically changing a precision of a corresponding layer based on a result of the determination.

In an embodiment, performing the representation form determination operation may include performing an overflow threshold determination operation of determining an overflow threshold, which is a maximum number of bits permitting an overflow; performing a random number generation operation of generating a random number between 0 and 1 in response to generation of the internal data; performing a permissible overflow range determination operation of determining a permissible overflow range by multiplying the overflow threshold by the random number; and performing a decimal point position determination operation of determining the position of the decimal point of the pieces of internal data based on the permissible overflow range.

In an embodiment, performing the representation form determination operation may further include performing stochastic rounding on the internal data, and performing the decimal point position determination operation is configured to determine a position of a decimal point of internal data, to which the stochastic rounding is applied, based on the permissible overflow range.

In an embodiment, performing the layer-wise precision determination operation may include performing a high-bit operation using a second precision, which is a precision higher than the first precision, for each layer during the operation in each of the feed-forward stage and the error propagation stage; and determining a similarity between a result of the low-bit operation using the first precision and a result of the high-bit operation using the second precision, and after the precision of the corresponding layer is determined based on the determined similarity, the precision of the corresponding layer may be changed based on a result of the determination.

In an embodiment, performing the layer-wise precision determination operation may further include setting first and second threshold values, which are references for a similarity based on which whether the precision of each layer is to be changed is determined, the second threshold value being set to a value greater than the first threshold value, and performing the layer-wise precision determination operation is configured to, when the similarity is less than or equal to the first threshold value, change the precision of the corresponding layer to a value higher than the first precision, when the similarity is equal to or greater than the second threshold value, change the precision of the corresponding layer to a value lower than the first precision, and when the similarity is between the first threshold value and the second threshold value, maintain the first precision.

In an embodiment, performing the layer-wise precision determination operation may be configured to automatically determine the precision of the corresponding layer, for all layers except the input layer and the output layer.

In an embodiment, performing the layer-wise precision determination operation may be configured to automatically determine the precision of each layer only during first m iterations, among multiple iterations included in each epoch, which is a training unit for each layer, and performing the training operation may be configured to perform training during iterations ranging from an (m+1)-th iteration based on the precision of each layer automatically determined in the layer-wise precision determination operation.

In an embodiment, performing the layer-wise precision determination operation may further include a configuring a Finite-State Machine (FSM) based on results of the low-bit operation and the high-bit operation for automatically determining the precision of each layer during the first m iterations and the precision of the corresponding layer is changed based on a result of the configuration.

In an embodiment, performing the layer-wise precision determination operation may be configured to, in the feed-forward stage, perform a high-bit operation by adding a bit corresponding to at least one of a feed-forward weight and an input activation value of the deep neural network, and in the error propagation stage, perform a high-bit operation by adding a bit corresponding to at least one of a backward weight and an error value of the deep neural network.

BRIEF DESCRIPTION OF THE DRAWINGS

The above and other objects, features and advantages of the present invention will be more clearly understood from the following detailed description taken in conjunction with the accompanying drawings, in which:

FIG. 1 is a diagram illustrating the reason why training of a typical deep neural network requires bit precision higher than that of inference (feed-forward);

FIG. 2 is a schematic block diagram of an apparatus for training a deep neural network according to an embodiment of the present invention;

FIGS. 3 to 6 are flowcharts illustrating the processing flow of a method for training a deep neural network according to an embodiment of the present invention;

FIGS. 7A to 7D are diagrams illustrating examples of an algorithm for implementing a method for training a deep neural network according to an embodiment of the present invention;

FIG. 8 is a diagram schematically illustrating stochastic rounding applied to a method for training a deep neural network according to an embodiment of the present invention;

FIG. 9 is a diagram schematically illustrating stochastic thresholding applied to the deep-neural-network training method according to an embodiment of the present invention;

FIGS. 10A to 10C are diagrams schematically illustrating a layer-wise precision determination step according to an embodiment of the present invention; and FIG. 11 is a diagram for explaining the structure of a Finite-State Machine (FSM) applied to the layer-wise precision determination step according to an embodiment of the present invention.

DESCRIPTION OF THE PREFERRED EMBODIMENTS

Hereinafter, embodiments of the present invention will be described in detail with reference to the attached drawings. The present invention will be described in detail such that those skilled in the art to which the present invention pertains can easily practice the present invention. The present invention may be embodied in various different forms, and is not limited to the following embodiments. Meanwhile, in the drawings, parts irrelevant to the description of the invention will be omitted so as to clearly describe the present invention. It should be noted that the same or similar reference numerals are used to designate the same or similar components throughout the drawings. Descriptions of known configurations which allow those skilled in the art to easily understand the configurations will be omitted below.

In the specification and the accompanying claims, when a certain element is referred to as "comprising" or "including" a component, it does not preclude other components, but may further include other components unless the context clearly indicates otherwise.

FIG. 2 is a schematic block diagram of an apparatus for training a deep neural network according to an embodiment of the present invention. Referring to FIG. 2, the apparatus for training a deep neural network including a hidden layer composed of n layers (where n is a natural number) between an input layer and an output layer according to the present invention includes an input means 100 and a training means 200.

The input means 100 may be a means for receiving training data required to train the deep neural network, and may receive, for example, a data set (e.g., CIFAR-10 data set or the like) including images randomly selected for respective classes. This data set is called an epoch, and one epoch is composed of multiple iterations, wherein a weight update (weight gradient update) is performed once per iteration during training of the deep neural network.

The training means 200 is a means for training the deep neural network using the training data, received through the input means 100, and may include a training module 210, a representation form determination module 220, and a layer-wise precision determination module 230, as illustrated in FIG. 2.

The training module 210 performs training using the training data so that training is performed using a first precision preset for each layer. Typically, the first precision may be a high bit precision (e.g., 16-bit precision), but, in an embodiment of the present invention, the case where the first precision is set to a low bit precision (e.g., 8-bit precision) in order to apply the training apparatus to a mobile device will be described.

The representation form determination module 220 determines a representation form for representing pieces of internal data (e.g., pieces of data generated as the result of a convolution) that are generated during an operation (calculation) process for training. In particular, the representation form determination module 220 determines the position of the decimal point of the pieces of internal data so as to randomly vary a permissible overflow bit in a dynamic fixed-point system, thus enabling both a small number and a large number to be precisely represented.

That is, when an overflow occurs in a fixed-point system, a decimal point is generally moved so as to immediately increase the number of bits in an integer part. This case is characterized in that, in order to represent a large number, small numbers are inaccurately represented. Therefore, control may be performed such that a predetermined number of bits for which an overflow is permitted are set, and such that a decimal point is moved to increase the number of bits of the integer part only when an overflow exceeding the set number of bits occurs, thus enabling small numbers to be accurately represented. However, in this case, a problem may arise in that the number of bits assigned to the integer part becomes smaller, and thus accuracy may be lost as large numbers are inaccurately represented. These characteristics of the fixed-point system are not greatly problematic at a high bit precision in which the numbers of bits in an integer part and a fractional part can be secured as predetermined numbers of bits or more, but may be the cause of loss of accuracy at a low bit precision.

Therefore, the representation form determination module 220 may be configured to include a storage unit for storing an overflow threshold, which is the maximum number of bits permitting an overflow; a random number generator for generating a random number between 0 and 1 in response to the generation of the internal data; a multiplier for determining a permissible overflow range by multiplying the overflow threshold by the random number; and a decimal point position determination unit for determining the position of the decimal point of the pieces of internal data based on the permissible overflow range. Further, the representation form determination module 220 may randomly determine the permissible overflow bit within a range from 0 to the overflow threshold, thus solving the above problem. In this way, the present invention may be a scheme for leaving a margin in the number of overflow bits based on which it is determined whether to increase an integer part, may stochastically use the number of overflow bits, and may use the integer part, changed through the above procedure, during iterations ranging from a next iteration.

Also, the representation form determination module 220 may further include a rounding unit for performing stochastic rounding on the internal data, and the decimal point position determination unit may determine the position of the decimal point based on the permissible overflow range for the internal data to which stochastic rounding is applied.

Here, stochastic rounding (SR) is intended to introduce the concept of probability into rounding, unlike typical rounding. In detail, unlike existing rounding, in which the value to be rounded is defined for a given value, the stochastic rounding (SR) is a scheme for taking into consideration the possibility of another type of rounding, and is characterized in that both rounded-up and rounded-down results may appear according to stochastic rounding and in that the probability that a value close to a rounded-up or rounded-down value will appear when rounding up or down is performed is higher than the probability in other cases. However, since the possibility that a value far away from the rounded-up or rounded-down value will appear is not unprecedented, a result obtained when rounding down is performed may also appear. Therefore, stochastic rounding may enable training of a low-bit deep neural network by reducing errors appearing due to rounding when the number of iterations is increased. For this stochastic rounding, reference is to be made to the prior art (e.g., a thesis entitled "DoReFa-Net: Training Low Bitwidth Convolutional Neural Networks with Low Bitwidth Gradients, Arxiv: 1606.06160").

The layer-wise precision determination module 230 determines the precision of each layer constituting the deep neural network and automatically changes the precision of the corresponding layer based on the result of the determination. In particular, unlike the conventional scheme in which a person is directly involved in determination or in which the results of inference of the deep neural network are checked, after which precision is predicted, the layer-wise precision determination module 230 may be operated during training of the deep neural network, and may determine whether precision is to be scaled by comparatively checking a similarity between intermediate operation results of a high-bit operation and a low-bit operation, rather than final inference results. Therefore, the layer-wise precision determination module 230 is characterized in that, as well as inference, the precision of errors and the precision of weights required in a training process may also be searched for.

For this operation, during an operation in each of an inference (feed-forward) stage and an error propagation stage, the layer-wise precision determination module 230 may further perform, for each layer, a high-bit operation based on second precision, which is precision higher than the first precision, which is the initially set precision, and may determine the precision of the corresponding layer based on a similarity between the result of the low-bit operation using the first precision and the result of the high-bit operation using the second precision. That is, the layer-wise precision determination module 230 may store a first threshold value, which is preset as the reference for a similarity based on which whether precision is to be changed for each layer is determined, and a second threshold value, which is preset to a value greater than the first threshold value. Further, the layer-wise precision determination module 230 may be operated to change the precision of the corresponding layer to a value higher than the first precision when the similarity is less than or equal to the first threshold value, change the precision of the corresponding layer to a value lower than the first precision when the similarity is equal to or greater than the second threshold value, and maintain the first precision when the similarity is between the first threshold value and the second threshold value.

In other words, during the operation in each of the inference (feed-forward) stage and the error propagation stage, the layer-wise precision determination module 230 may perform a procedure for performing a low-bit operation and a high-bit operation for each layer, deriving a similarity between respective result values of the low-bit operation and the high-bit operation, predicting that high precision is required and increasing the first precision when the similarity is low, and decreasing the first precision when the similarity is high, thus automatically finding the optimal precision of each layer and changing the current precision to the optimal precision.

Here, the layer-wise precision determination module 230 may automatically change the precision of each layer, with respect to all layers constituting the deep neural network, except the input layer and the output layer.

Furthermore, the layer-wise precision determination module 230 may automatically change the precision of each layer during only first (initial) m iterations, among multiple iterations included in each epoch, which is the training unit of each of the layers. The training module 210 may perform training based on the precision of each layer, which is automatically changed by the layer-wise precision determination module 230, during iterations ranging from (m+1)-th iteration. For example, the layer-wise precision determination module 230 automatically changes the precision of each layer only during first to third iterations for each epoch, and the training module 210 may perform training by applying the changed precision to the iterations ranging from the fourth iteration of the corresponding layer.

Meanwhile, the layer-wise precision determination module 230 may configure a Finite-State Machine (FSM) depending on the results of the low-bit operation and the high-bit operation that are performed so as to automatically determine the precision of each layer during first m iterations for each epoch, and may change the precision of the corresponding layer based on the results of the configuration of the FSM. At this time, the layer-wise precision determination module 230 may perform a high-bit operation by adding a bit corresponding to at least one of the feed-forward weight and the input activation value of the deep neural network in the inference (feed-forward) stage, and may perform a high-bit operation by adding a bit corresponding to at least one of the backward weight and the error value of the deep neural network in the error propagation stage.

FIGS. 3 to 6 are flowcharts illustrating the processing flow of a method for training a deep neural network according to an embodiment of the present invention. Referring to FIGS. 2 to 6, the deep-neural-network training method according to the embodiment of the present invention is described below.

First, at step S100, the input means 100 receives training data for training the deep neural network. Here, at step S100, a data set (e.g., CIFAR-10 data set or the like) including images randomly selected for respective classes may be received.

At step S200, the training means 200 trains the deep neural network using the received training data.

For this operation, at step S210, the training module 210 performs training using the training data so that training is performed using a first precision preset for each layer. Typically, the first precision may be high bit precision (e.g., 16-bit precision), but in an embodiment of the present invention, the case where the first precision is set to low bit precision (e.g., 8-bit precision) in order to apply the training apparatus to a mobile device will be described.

At step S220, the representation form determination module 220 determines a representation form for representing pieces of internal data (e.g., pieces of data generated as the result of a convolution) that are generated during an operation (calculation) process for training. In particular, the representation form determination module 220 determines the position of the decimal point of the pieces of internal data so as to randomly vary a permissible overflow bit in a dynamic fixed-point system, thus enabling both a small number and a large number to be precisely represented.

For this operation, the representation form determination module 220 may determine an overflow threshold, which is the maximum number of bits permitting an overflow at step S221, generate a random number between 0 and 1 in response to the generation of the internal data at step S222, determine a permissible overflow range by multiplying the overflow threshold by the random number at step S223, perform stochastic rounding on the internal data at step S224, and determine the position of the decimal point of the pieces of internal data based on the permissible overflow range at step S225, wherein the position of the decimal point based on the permissible overflow range may be determined for the internal data to which the stochastic rounding is applied.

At step S230, the layer-wise precision determination module 230 determines the precision of each layer during an operation in each of an inference (feed-forward) stage and an error propagation stage that are performed for the training, and automatically changes the precision of the corresponding layer based on the result of the determination.

For this operation, the layer-wise precision determination module 230 performs a high-bit operation using a second precision, which is a precision higher than the first precision of each layer, during the operation in each of the feed-forward stage and the error propagation stage at step S231, determines a similarity between the result of the low-bit operation using the first precision and the result of the high-bit operation using the second precision at step S232, determines the precision of the corresponding layer based on the determined similarity at step S233, and changes the precision of the corresponding layer based on the result of the determination at step S234.

Here, step S230 may further include the threshold setting step of setting first and second threshold values, which are references for a similarity based on which whether precision is to be changed for each layer is determined, wherein the second threshold value is set to a value greater than the first threshold value. Here, the threshold setting step may be configured to change the precision of the corresponding layer to a value higher than the first precision when the similarity is less than or equal to the first threshold value, change the precision of the corresponding layer to a value lower than the first precision when the similarity is equal to or greater than the second threshold value, and maintain the first precision when the similarity is between the first threshold value and the second threshold value.

Here, at step S230, for all layers constituting the deep neural network except the input layer and the output layer, the precision of the corresponding layer may be automatically determined.

Further, step S230 may be configured to automatically determine the precision of each layer during only first m iterations, among multiple iterations included in each epoch, which is the training unit of each of the layers, and step S200 may be configured to perform training during iterations ranging from an (m+1)-th iteration based on the precision of each layer, which is automatically determined at step S230.

Meanwhile, step S230 may further include a Finite-State Machine (FSM) configuration step of configuring an FSM depending on the results of the low-bit operation and the high-bit operation performed to automatically determine the precision of each layer during first m iterations of each epoch, wherein the precision of the corresponding layer may be changed based on the result of the configuration of the FSM. In this case, step S230 may be configured to perform the high-bit operation by adding a bit corresponding to at least one of the feed-forward weight and the input activation value of the deep neural network in the feed-forward stage, and may perform the high-bit operation by adding a bit corresponding to at least one of the backward weight and the error value of the deep neural network in the error propagation stage.

FIGS. 7A to 7D are diagrams illustrating examples of an algorithm for implementing a method for training a deep neural network according to an embodiment of the present invention. wherein FIG. 7A illustrates an overall algorithm (Algorithm 1) for training a deep neural network according to an embodiment of the present invention, FIG. 7B illustrates an algorithm (Algorithm 2) for varying a permissible overflow bit in a dynamic fixed-point system according to an embodiment of the present invention, FIG. 7C illustrates an algorithm (Algorithm 3) for determining the position of a decimal point using the determined permissible overflow bit, and FIG. 7D illustrates an algorithm (Algorithm 4) for scaling the precision of each layer according to an embodiment of the present invention.

Referring to FIG. 7A, Algorithm 1 illustrates the overall training process including a change in the number of bits, and shows how a number system provided in the present invention is introduced and a neural network is trained. In the example of FIG. 7A, e denotes epoch and i denotes an iteration. Here, the iteration is composed of a feed-forward (FF) stage, an error propagation (EP) stage, and a weight gradient update (WG) stage, and performs a task of changing the number representation form to a fixed-point (FXP) representation before a convolution operation is performed so as to perform low-bit training. Further, a loss function calculation procedure is included between the feed-forward (FF) stage and the error propagation (EP) stage. Furthermore, when all of the feed-forward (FF)-error propagation (EP)-weight gradient update (WG) stages are terminated, the number of bits required for each layer is determined through a function called "SliceAdapt", and training is performed based on the changed number of bits from a next iteration.

Here, 'Slice' denotes the basic bit increment used to adjust the number of bits, and may be 1 bit, 2 bits or 4 bits. The examples of FIGS. 7A to 7D show that Slice is defined as 1 bit and the number of bits is precisely changed on a 1 bit basis.

Referring to FIG. 7B, Algorithm 2 describes how fixed-point translation is implemented to translate a floating-point number or a fixed-point number, which has a large number of bits, into a small number of bits, and exemplifies clipping of, when a number is much larger or smaller than numbers within a possible representation range, replacing and representing the corresponding number with the largest number or the smallest value, among representable numbers, together with the translation. In the example of FIG. 7B, assuming that I is the number of bits in an integer part and S is the total number of bits, a method for translating a given number into a Fixed Point (FXP) representation is exemplified, wherein, when the number desired to be represented falls out of the possible range that can be represented by the current number of bits, the given number is represented by the number closest to the given number, among the representable numbers.

Referring to FIG. 7C, Algorithm 3 represents a method for changing the number of bits in an integer part of a dynamic floating point, and exemplifies a method for adjusting the number of bits to be allocated to the integer part depending on an overflow or a surplus in a dynamic fixed-point system.

Referring to FIG. 7D, Algorithm 4 represents an example of a Layer-wise Adaptive Precision Scaling (LAPS) algorithm according to the present invention, and illustrates an example in which a Finite-State Machine (FSM) is utilized to dynamically adjust the number of bits. That is, Algorithm 4 indicates a function of predicting the number of bits required in a next iteration.

FIG. 8 is a diagram schematically illustrating stochastic rounding applied to a method for training a deep neural network according to an embodiment of the present invention. Referring to FIG. 8, stochastic rounding applied to the deep-neural-network training method according to an embodiment of the present invention is configured to introduce the concept of probability into rounding, unlike existing rounding. This shows that, unlike existing rounding, in which the value to be rounded is defined for a given value, the stochastic rounding (SR) is a scheme in which the possibility that rounding will occur in other forms is taken into consideration. For this stochastic rounding, reference is to be made to a thesis entitled "DoReFa-Net: Training Low Bitwidth Convolutional Neural Networks with Low Bitwidth Gradients, Arxiv:1606.06160".

That is, existing deterministic rounding is a scheme in which, when a number is less than 0.5, it is rounded to 0, whereas when a number is equal to or greater than is 0.5, the number is rounded to 1, thus resulting in a great loss of accuracy when the number of bits is decreased. In contrast, stochastic rounding is a scheme configured to stochastically round the value rather than using the conventional deterministic rounding, thus reducing the loss. For example, assuming that 0.4 is stochastically rounded, 0.4 is rounded to 0 with a probability of 60%, and is rounded to 1 with a probability of 40%. In the example of FIG. 8, such stochastic rounding is described based on equations and a simple drawing.

FIG. 9 is a diagram schematically illustrating stochastic thresholding applied to the deep-neural-network training method according to an embodiment of the present invention. Referring to FIG. 9, stochastic thresholding applied to the deep-neural-network training method according to the embodiment of the present invention is scheme for leaving a margin in the number of overflows based on which whether to increase an integer part is determined. In this case, the number of overflows is also stochastically determined, and the changed integer part is used from a next iteration.

The stochastic thresholding exemplified in FIG. 9 is implemented to correct a scheme for controlling an integer part through an overflow in a typical dynamic fixed-point system. That is, when overflow occurs in a dynamic fixed-point system, the loss of accuracy relative to a large number or a small number is determined depending on how sensitively the number of bits allocated to the integer part is to be changed. When the occurrence of the overflow is immediately applied to the integer part whenever an overflow occurs, there are characteristics in that accuracy for a large number may be secured, whereas accuracy for a small number may be lost, and in that, in the opposite case, accuracy for a small number may be secured, whereas a precision for a large number may be lost. Therefore, in the stochastic thresholding illustrated in FIG. 9, an overflow threshold TH may be preset, and a random number between 0 and 1 may be generated in response to the generation of internal data, and may then be multiplied by the overflow threshold TH, with the result that a permissible overflow range may be determined. Meanwhile, stochastic rounding may be performed on the internal data, and thus the position of a decimal point of the internal data may be determined by applying the permissible overflow range to the stochastically rounded internal data. Accordingly, when the stochastic thresholding according to the present invention is applied, the loss of accuracy that may occur in the typical dynamic fixed-point system may be minimized, and accuracy at a low bit precision may also be improved.

FIGS. 10A to 10C are diagrams schematically showing a layer-wise precision determination step according to an embodiment of the present invention. FIG. 10A is a diagram illustrating an example in which the optimal numbers of bits for respective layers are determined according to an embodiment of the present invention, and FIGS. 10B and 10C illustrate examples in which precision changes in each epoch as a result of deep-neural-network training, wherein FIG. 10B illustrates a change in precision during an inference (feed-forward) procedure and FIG. 10C illustrates a change in precision during an error propagation procedure.

In this way, at the layer-wise precision determination step, during a first (initial) iteration of each epoch, the result of low-bit operation and the result of high-bit operation are compared with each other. The number of pixels (neurons) for which the difference between the comparison result exceeds a specific threshold value, that is, exhibits a large difference, may be counted, and the count result value may be transferred to a precision finite-state machine (i.e., a precision FSM), such as that illustrated in FIG. 11, and thus the number of bits to be applied to iterations ranging from a next iteration may be determined.

FIG. 11 is a diagram illustrating the structure of a finite-state machine (FSM) applied to the layer-wise precision determination step according to the embodiment of the present invention, and illustrates an example in which the layer-wise precision determination step according to the present invention is applied to training of a convolutional neural network (CNN), among processes for training deep neural networks. The FSM illustrated in FIG. 11 illustrates a comparison between different high-bit and low-bit operations during respective iterations. Referring to FIG. 11, during a first iteration, an operation is performed by increasing the number of bits in an input value (activation: a) by 2 bits while maintaining the number of bits in a weight (w). Compared to the result of performing a convolution operation using existing precision, the number of times that a value greater than a preset threshold value appears is counted. When a value having a large difference from the preset threshold value frequently appears, it may be determined that the results of the two operations greatly differ from each other, and the number of bits in the previous input value (a) is increased by 1. In contrast, when the value having a large difference does not frequently appear, the number of bits is decreased by 1. When this determination is ambiguous, the current number of bits is maintained. The process for adjusting the number of bits in this way is equally repeated during second and third iterations, but there is a difference in that only the number of bits in the weight (w) is changed during the second iteration and the numbers of bits both in the input value (a) and in the weight (w) are changed during the third iteration.

However, in the layer-wise precision determination step, the precision of a first layer (input layer) and the last layer (output layer) of the neural network is not changed, and the first layer has 12 bits and the last layer has a variable number of bits depending on the types of objects to be classified.

When the layer-wise precision determination method is used in this way, the numbers of bits required in ResNet-9, ResNet-18, VGG-16, and SENet may be reduced to 6.53, 5.70, 6.54, and 6.92 on average when a CIFAR-100 data set is learned, which shows values respectively reduced by 18.4%, 28.8%, 18.3%, and 13.5% compared to the case where training is performed in the state in which the number of bits is fixed to 8 bits in all layers.

As described above, the layer-wise precision determination step is a method for determining the number of bits depending on the difference between the result of an operation at a given precision and the result of an operation at a higher precision, and is implemented such that, when the difference between the operation results is large, it is indirectly predicted that high precision is required, otherwise it is predicted that low precision is required, thus adjusting the number of bits based on the result of the prediction.

However, this method may decrease the speed of training when a search for precision is frequently attempted because the results of operations at a precision higher than that of a basic operation are also produced. However, since the layer-wise precision determination step according to the present invention is performed only during an initial stage of each epoch (e.g., first one to three times), a required precision may be found while the deterioration of training speed is minimized.

As described above, the present invention may provide a Stochastic Dynamic FiXed-Point (SDFXP) system, which is a new number system for accurately training a deep neural network at a low bit precision, and a Layer-wise Adaptive Precision Scaling (LAPS) method, and may be a basis for developing a current artificial intelligence processor from an artificial intelligent processor, which accelerates only inference (feed-forward), to an artificial intelligence processor, which can also accelerate on-chip learning at low power consumption and at high speed.

Further, the present invention may be applied to all fields requiring real-time training of a deep neural network in mobile devices. In particular, when a deep neural network trained by a server is retrained in conformity with the environment of a user and the purpose of use of the deep neural network, or when a changing environment, the shape of an object, etc. in an application such as object tracking need to be adapted to the deep neural network, the present invention may be utilized. Through distributed training, the concentration of the burden of neural network training on the server may be reduced, and the problem of the intrusion of privacy may be solved. Finally, the present invention may correct the problem of low accuracy of a mobile-type deep neural network through real-time training, thus supporting a more accurate and user-friendly application.

In particular, the accuracy of all applications in which a deep neural network is used, such as in an automatic-face recognition function on a smartphone, may be remarkably improved. Further, the present invention may be utilized in object-tracking systems such as mobile drones, which have been widely developed, user-speech learning systems for improving the accuracy of speech recognition of mobile devices, and search engines for learning the search preferences of each user, and thus it may be considered that the value that can be created by the present invention is considerable and marketability is high.

The apparatus and method for training a low-bit-precision deep neural network may introduce a Stochastic Dynamic FiXed-Point (SDFXP) system and determine the number of integer bits of training data, thus obtaining the effect similar to the effect of learning at a large number of bits even at a small number of bits. Further, the present invention may determine a similarity by comparing the result of a high-bit operation with the result of a low-bit operation during an operation in each of a feed-forward stage and an error propagation stage based on a Layer-wise Adaptive Precision Scaling (LAPS) algorithm, and may determine whether the precision of a corresponding layer is to be scaled based on the result of the determination, thus automatically finding the optimal precision of each layer of the deep neural network, with the result that bit precision may be optimized to meet different precision requirements for respective layers. Furthermore, the present invention may find the optimal precision of a corresponding layer during the course of training and perform a comparison between operations only during only some initial iterations, among multiple iterations included in each epoch, thus minimizing the amount of time required to scale the precision of each layer.

In this way, the present invention enables low-bit-precision training, so that training of a deep neural network in a high-speed or low-power environment may be realized, thus enabling acceleration of a deep neural network in mobile devices, and overcoming the restrictions of existing mobile devices that have supported only inference (feed-forward), such as distributed training, user optimization, and adaptation to an environmental change, by means of network acceleration, and promoting the development of new applications.

In particular, the present invention is advantageous in that the present invention may be utilized when training is performed in a mobile device for distributed training, when a deep neural network trained by the server is retrained in conformity with the environment of a user and the purpose of use thereof, or when a deep neural network needs to be adapted to a varying environment or the shape of an object in an application such as an object-tracking application, thus being utilized in object-tracking systems such as mobile drones, user-speech learning systems for improving the accuracy of speech recognition of mobile devices, and search engines for learning the search preferences of each user.

Although the preferred embodiments of the present invention have been disclosed in the foregoing descriptions, those skilled in the art will appreciate that the present invention is not limited to the embodiments, and that various modifications, additions and substitutions are possible, without departing from the scope and spirit of the invention as disclosed in the accompanying claims.

What is claimed is:

1. A method for training a deep neural network including a hidden layer composed of n layers, where n is a natural number, between an input layer and an output layer, the method comprising:

performing an input operation of receiving training data required to train the deep neural network;

performing a training operation of training the deep neural network using the training data, wherein the training operation is performed exclusively using fixed-point arithmetic implemented by integer arithmetic logic based on a stochastic dynamic fixed-point system (SDFXP) for all forward-propagation activation values, backward-propagation error values, and weight values, wherein a first-bit operation with a first precision of 8 bits or less is preset for each layer, wherein the training operation comprises;

performing a representation form determination operation of determining a representation form for pieces of internal data generated during the training and determining a position of a decimal point of the pieces of internal data such that a permissible overflow bit in a dynamic fixed-point system varies randomly, the representation form determination operation comprising:

retrieving, from a storage unit an overflow threshold value which represents a maximum number of bits permitting overflow in the dynamic fixed-point system;

generating, by a random number generator, a random number between 0 and 1 in response to the generation of the internal data;

selecting, by a multiplier, a permissible overflow range by multiplying the overflow threshold value by the random number;

performing, by a stochastic rounding unit, stochastic rounding on the internal data; and determining, by a decimal point position determination unit the position of the decimal point of the internal data based on the permissible overflow range after the stochastic rounding;

performing a layer-wise precision determination operation of determining for each layer of the deep neural network, a precision during each of a feed-forward stage and an error propagation stage of the training, and automatically adjusting the first precision of that layer based on a result of the determination, the layer-wise precision determination operation comprising:

performing a second-bit operation using a second precision, which is higher than the first precision, for the layer during the feed-forward stage and the error propagation stage;

determining a similarity between a result of the first-bit operation using the first precision and a result of the second-bit operation using the second precision for the layer;

using a Finite-State Machine (FSM) to adjust the first precision of the layer during an initial training phase comprising a predetermined number m of iterations by varying a number of bits of at least one of a weight (w) and an input activation value (a) of the layer in each iteration based on the determined similarity for that iteration, wherein if a difference between results of the first-bit operation and the second-bit operation exceeds a predefined threshold, the number of bits for said at least one of w and a is increased for a next iteration, if the difference does not exceed the predefined threshold, the number of bits is decreased for the next iteration, and if the difference is indeterminate, the number of bits is maintained, thereby searching for an optimal bit precision for the layer, and fixing the precision of the layer at the determined optimal bit precision for all remaining training iterations after said initial m iterations.

\* \* \* \* \*